(12) United States Patent
Hsieh

(10) Patent No.: US 8,414,070 B2
(45) Date of Patent: Apr. 9, 2013

(54) SADDLE ADJUSTING DEVICE

(75) Inventor: Shu-Erh Hsieh, Taichung (TW)

(73) Assignee: Ming Cycle Industrial Co., Ltd., Taichung Hsien (TW)

( * ) Notice: Subject to any disclaimer, the term of this patent is extended or adjusted under 35 U.S.C. 154(b) by 0 days.

(21) Appl. No.: 13/347,936

(22) Filed: Jan. 11, 2012

(65) Prior Publication Data

US 2012/0104811 A1    May 3, 2012

Related U.S. Application Data

(63) Continuation-in-part of application No. 12/688,882, filed on Jan. 16, 2010, now abandoned.

(30) Foreign Application Priority Data

Jun. 16, 2009  (TW) ............................... 98210735 U

(51) Int. Cl.
    *B62J 1/00*    (2006.01)
(52) U.S. Cl.
    USPC ...................................................... 297/215.13
(58) Field of Classification Search ............. 297/215.13, 297/195.1, 463.1; 248/408
    See application file for complete search history.

(56) References Cited

U.S. PATENT DOCUMENTS

| | | | | |
|---|---|---|---|---|
| 4,150,851 A | * | 4/1979 | Cienfuegos | 297/215.13 |
| 4,919,378 A | * | 4/1990 | Iwasaki et al. | 248/295.11 |
| 5,044,592 A | * | 9/1991 | Cienfuegos | 248/408 |
| 6,354,557 B1 | * | 3/2002 | Walsh | 248/600 |
| 6,913,560 B2 | * | 7/2005 | Ryan et al. | 482/51 |

* cited by examiner

*Primary Examiner* — Milton Nelson, Jr.

(57) ABSTRACT

A saddle adjusting device is slidably disposed on a seat tube and comprises a seat body. The seat body is provided on a top end thereof with a saddle and includes a through portion for insertion of the seat tube. The seat body is provided with at least one seat tube clamp for clamping the seat body on the seat tube and further provided in a middle portion of the through portion with a hollow portion laterally penetrating the seat body and plural engaging grooves. The seat tube is fixedly provided with a bolt for cooperating with the engaging assembly. The engaging assembly can move along the bolt in a direction vertical to the axial direction of the seat tube to make protruding portions of the engaging assembly engage into or disengage from the engaging grooves for adjusting the position of the seat body relative to the seat tube.

13 Claims, 6 Drawing Sheets

SADDLE ADJUSTING DEVICE

This application is a continuation in part of U.S. patent application Ser. No. 12/688,882, now abandoned after filing this application Ser. No. 13/347,936, which claims the benefit of the earlier filing date of Jan. 16, 2010. Claims 1-12 of this application correspond to claims 1-12 of the U.S. patent application Ser. No. 12/688,882, and claim 13 of this application is revised from claims 13 and 14 of the U.S. patent application Ser. No. 12/688,882.

BACKGROUND OF THE INVENTION

1. Field of the Invention

The present invention relates to a saddle adjusting technology, and more particularly to a saddle adjusting device for a folding bicycle which can offer a multi-height adjusting and assuredly-fixing function.

2. Description of the Prior Art

Common bicycle saddles are all disposed on a top end of a seat post which is inserted into a bicycle frame, and the bicycle frame is provided with a seat post clamp for clamping the seat post to fix the seat post.

When the height of the saddle needs adjusting, the seat post clamp should unclamp the seat post first, and then the height of the seat post which protrudes out of the bicycle frame can be adjusted, and finally after the saddle is adjusted to a desired height, the seat post clamp will clamp the seat post again to fix the seat post on the bicycle frame.

However, the existing bicycle frames have various styles, and it is particularly so for the folding bicycles, because the folding bicycles must consider the volume after being folded so as to facilitate the carrying, therefore, there are many different forms of frames.

Referring to FIG. 1, a conventional triangular bicycle frame 8 essentially comprises a front post 81, a seat post 82 and a bottom post 83 that are pivotally connected to one another. The top end of the seat post 82 is pivotally connected to the top end of the front post 81, and the bottom end of the seat post 82 is pivotally connected to a rear wheel 84 and a rear end of the bottom post 83 while the front end of the bottom post 83 is fastened on a fastening seat 811 on a lower portion of the front post 81. The bottom end of the front post 81 is connected with a front fork 812 to be pivoted to the front wheel 85. The top end of the front post 81 is provided with a handlebar 86, and the middle portion of the bottom post 83 is provided with a chain ring 87 having a pair of cranks 88 and a pair of pedals 881. The chain ring 87 is drivingly connected to a smaller chain ring 89 disposed on the rear wheel 84 through a belt 871. The seat post 82 is further provided with a saddle mechanism 9. By such arrangements, a folding bicycle is formed.

The saddle mechanism 9 includes a seat body 91 which is slightly L-shaped and slidably engaged on the seat post 82. The top end of the seat body 91 is provided with a saddle 92.

When no external force is applied between the seat body 91 and the seat post 82, the seat body 91 and the seat post 82 are in loose fit state. The seat body 91 is provided with two seat post clamps 93 for clamping the seat body 91 on the seat post 82. The seat post 82 is provided with a bolt 94 having one end protruded out of the seat post 82, and the seat body 91 is defined with plural engaging grooves 95 correspondingly to the bolt 94. When the two seat post clamps 93 are loosened, the respective engaging grooves 95 will form clearances for insertion of the bolt 94, and when the two seat post clamps 93 are tightened, the engaging grooves 95 will be forced to clamp the bolt 94 fixedly.

In other words, the saddle mechanism 9 can be positioned at a desired position through the cooperation of the bolt 94 with the engaging grooves 95, and the seat body 91 is clamped on the seat post 82 by the two seat post clamps 93, thus realizing the position adjustment and fixing of the seat body 91.

Nevertheless, considering the lightness and the cost of the saddle mechanism 9, the above seat body 91 is made of engineering plastic, but the engineering plastic is still not rigid enough even it has a high strength, so that when the seat body 91 is clamped on the seat post 82 by the seat post clamps 93, the engineering-plastic-made seat body 91 itself will be compressed to cause elastic deformation. Therefore, the resulting clamping force is less than the clamping force applied by the conventional metal frame to the metal seat post, that is to say, when the seat body 91 bears the weight of the rider, the seat body 91 clamped by the two seat body clamps 93 will still slip slightly.

Commonly, a clearance difference between a loosened seat post clamp and a tightened seat post clamp is only about 1 to 2 mm, but the changing of the clearance must allow the engaging grooves 95 to define a clearance therebetween for passage of the bolt 94, so that the engaging portion of the engaging groove 95 for the bolt 94 only has a depth of 1-2 mm. Further since the bolt 94 is cylinder-shaped, the contact area between the engaging groove 95 and the bolt 94 is quite limited, and since the seat body 91 is made of the engineering plastic, when the seat body 91 bears the weight of the rider and slides relative to the seat post 82, the bolt 94 will be forced to disengage from the engaging groove 95, thus defeating the positioning effect. If such a situation occurs frequently, the engaging groove 95 will be damaged to cause permanent deformation, thus losing the positioning effect.

The present invention has arisen to mitigate and/or obviate the afore-described disadvantages.

SUMMARY OF THE INVENTION

The primary objective of the present invention is to provide a saddle adjusting device which is provided with an engaging assembly capable of moving in a direction vertical to the axial direction of the seat tube and position the seat body on the seat tube by engaging the protruding portions of the engaging assembly into the engaging grooves of the seat body and use the seat tube clamp to clamp the seat body on the seat tube so as to offer a multi-height adjustment and assuredly-fixing function.

The secondary objective of the present invention is to provide a saddle adjusting device which is provided on the seat body with a penetrating portion corresponding to the seat tube clamp, at the penetrating portion are formed two half rings, and the seat tube clamp can be used to assuredly fix the two half rings.

The third objective of the present invention is to provide a saddle adjusting device which can position the seat tube clamp during assembling process by providing two ears at both sides of the penetrating portion correspondingly to the pin of the seat tube clamp and defining an engaging hoe in each of the ears for insertion of the pin.

In order to achieve the above objectives, a saddle adjusting device in accordance with the present invention is slidably disposed on a seat tube and comprises a seat body. The seat body includes a support portion on a top end thereof for placement of a saddle, the seat body is provided with a through portion for insertion of the seat tube, and at least one seat tube clamp along the through portion for clamping the seat body on the seat tube. The seat body is provided in a middle portion of the through portion with a hollow portion which is formed with an opening in a front surface thereof. The hollow portion is formed in a rear surface thereof with plural engaging grooves which are evenly spaced to form a serrated edge, and the serrated edge formed by the spaced engaging grooves is in parallel to the seat tube. A bolt is perpendicular to and inserted in the seat tube, and an engaging assembly is slidably inserted on the bolt and provided with at least one protruding portions to selectively engage in the engaging grooves of the seat body.

By such arrangements, the engaging assembly can move in the direction vertical to the axial direction of the seat tube to make the protruding portions of the engaging assembly engage into or disengage from engaging grooves for adjusting the position of the seat body relative to the seat tube, and the seat tube clamp is used to clamp the seat body on the seat tube to offer the assuredly-fixing function.

Preferably, the seat body includes a penetrating portion corresponding to the seat tube clamp, and the seat body is provided with two half rings to form a part of the through portion at the penetrating portion, so that the seat tube clamp can tighten or loosen the two half rings to offer the assuredly-fixing function.

Preferably, the seat body is provided with two ears at both sides of the penetrating portion correspondingly to the pin of the seat tube clamp, and each of the ears is defined with an engaging hole for engagement with the corresponding pin, so that the seat tube clamp can be positioned on the seat body during the assembling process for facilitating assembly, and the seat tube clamp which has been installed can be located at an assured position to offer the assured function.

DETAILED DESCRIPTION OF THE PREFERRED EMBODIMENTS

Figure 1:
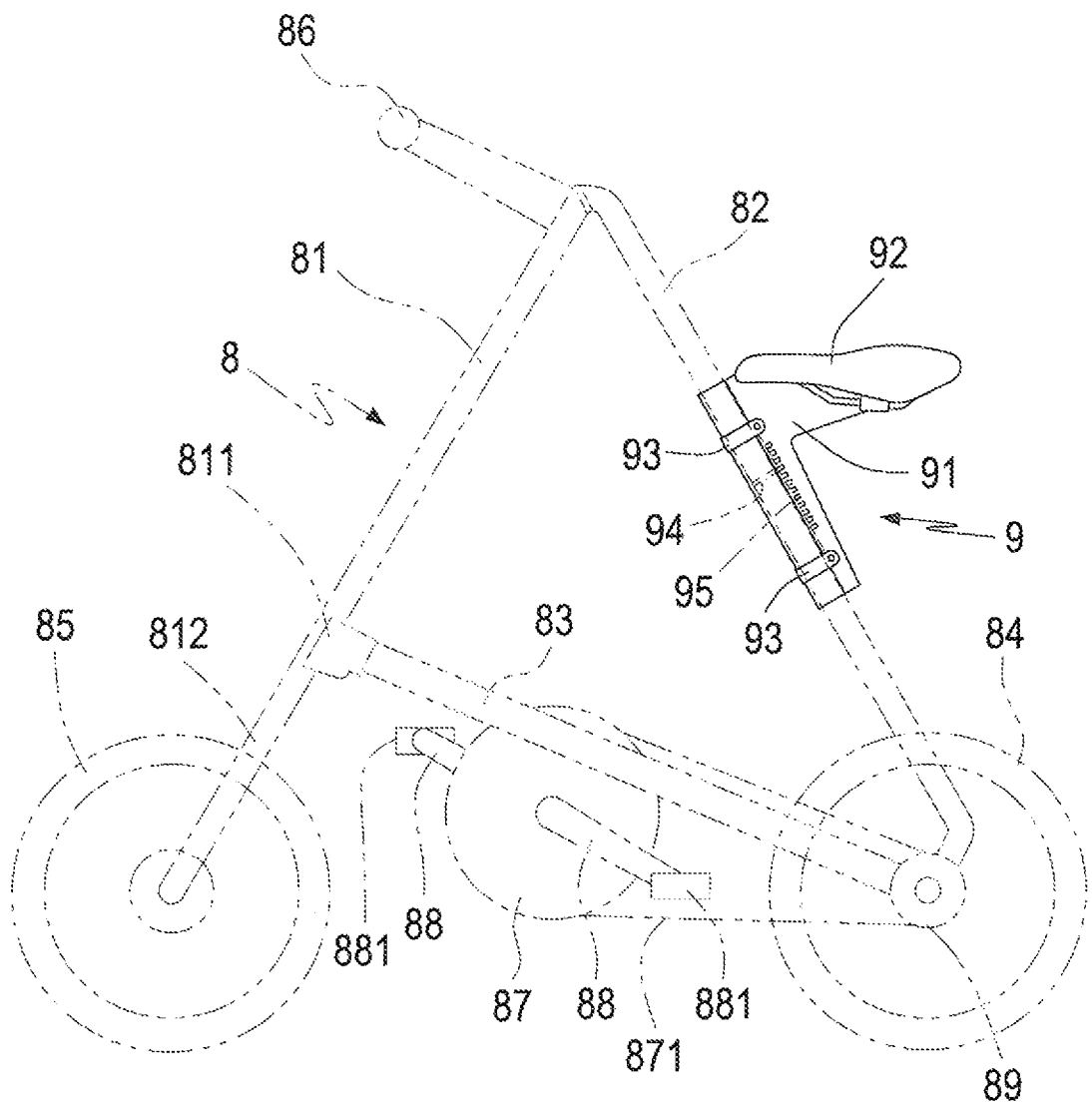
FIG. 1 is a schematic view of a conventional triangular bicycle frame.

The present invention will be clearer from the following description when viewed together with the accompanying drawings, which show, for purpose of illustrations only, the preferred embodiment in accordance with the present invention.

Referring to FIGS. 2-8, a saddle adjusting device 1 in accordance with the present invention is engaged on an inclined seat tube 2 and provided with a saddle 3 on a top end thereof. The saddle adjusting device 1 in accordance with the present invention comprises a seat body 10 which is made up of two symmetrical oppositely-connected shells 11, 12. The seat body 10 is formed with a support portion 13 on a top end thereof for placement of the saddle 3.

The seat body 10 includes a through portion 14 for insertion of the seat tube 2. Since the seat body 10 is made up of the shells 11, 12, the through portion 14 is formed between the two shells 11, 12. The seat body 10 is provided with two spaced seat tube clamps 15 along the through portion 14, and the seat tube clamps 15 are used to clamp the seat body 10 on the seat tube 2.

Figure 4:
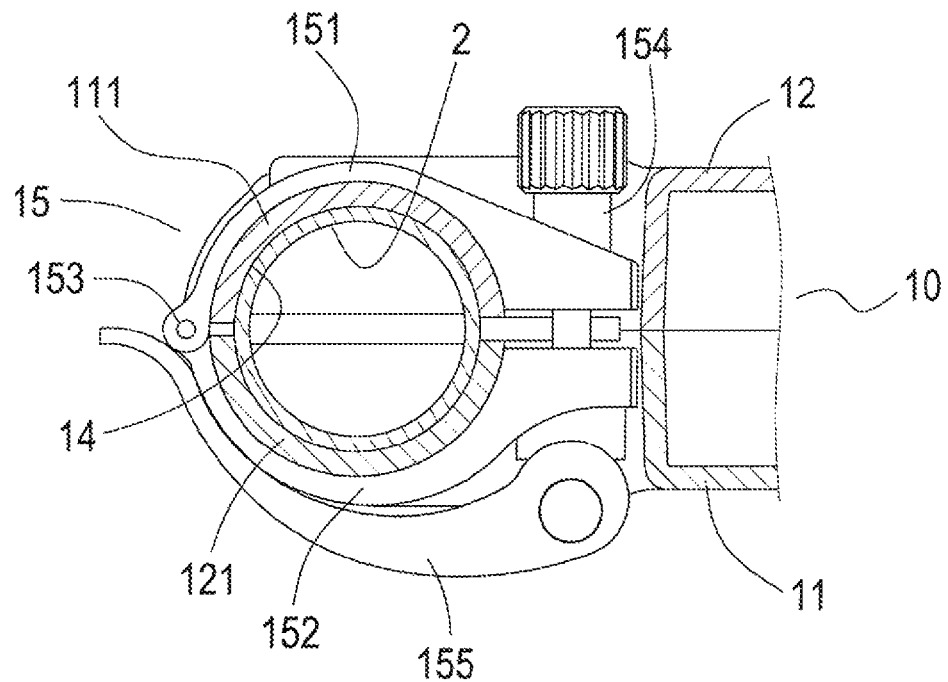
FIG. 4 is a cross-sectional view of the saddle adjusting device in accordance with the present invention along the line 4-4 of FIG. 2.

The seat body 10 includes a penetrating portion 101 corresponding to each of the seat tube clamps 15 and is provided with two half rings 111, 121 at each of the penetrating portions 101 to form a part of the through portion 14. Each of the seat tube clamps 15 includes two semi-circular pivotally connected fastening members 151, 152. One end of one of the two fastening members 151, 152 is pivotally connected to one end of the other of the two fastening members 151, 152 by a pin 153, and a shaft 154 is inserted through the other ends of both the two fastening members 151, 152. One end of the shaft 154 is eccentrically pivotally connected with a handle 155 in such a manner that the handle 155 can be pivoted to tighten the two fastening members 151, 152 to force the two half rings 111, 121 to clamp the seat tube 2 or loosen the two fastening members 151, 152 to make the two half rings 111, 121 unclamp the seat tube 2 (as shown in FIG. 4).

The structure of the seat tube clamp 15 is not the feature of the present invention, so no further description is provided herein.

The seat body 10 is provided with two ears 102 at both sides of each of the penetrating portions 101 correspondingly to the pin 153 of the seat tube clamps 15, and each of the ears 102 is defined with an engaging hole 103 for engagement with the corresponding pin 153 to position the respective seat tube clamps 15.

Figure 2:
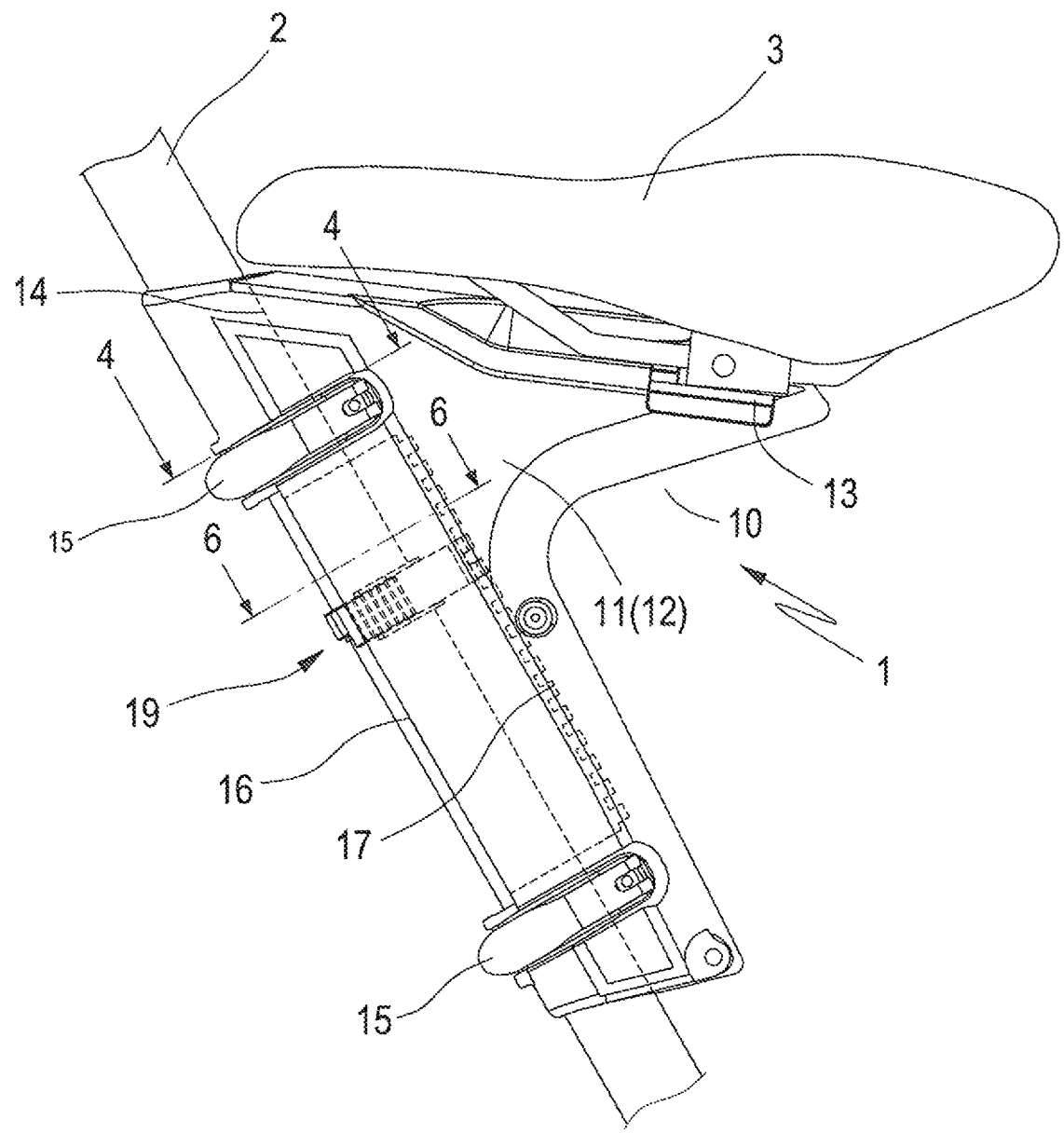
FIG. 2 is a plane view of a saddle adjusting device in accordance with the present invention.
Figure 3:
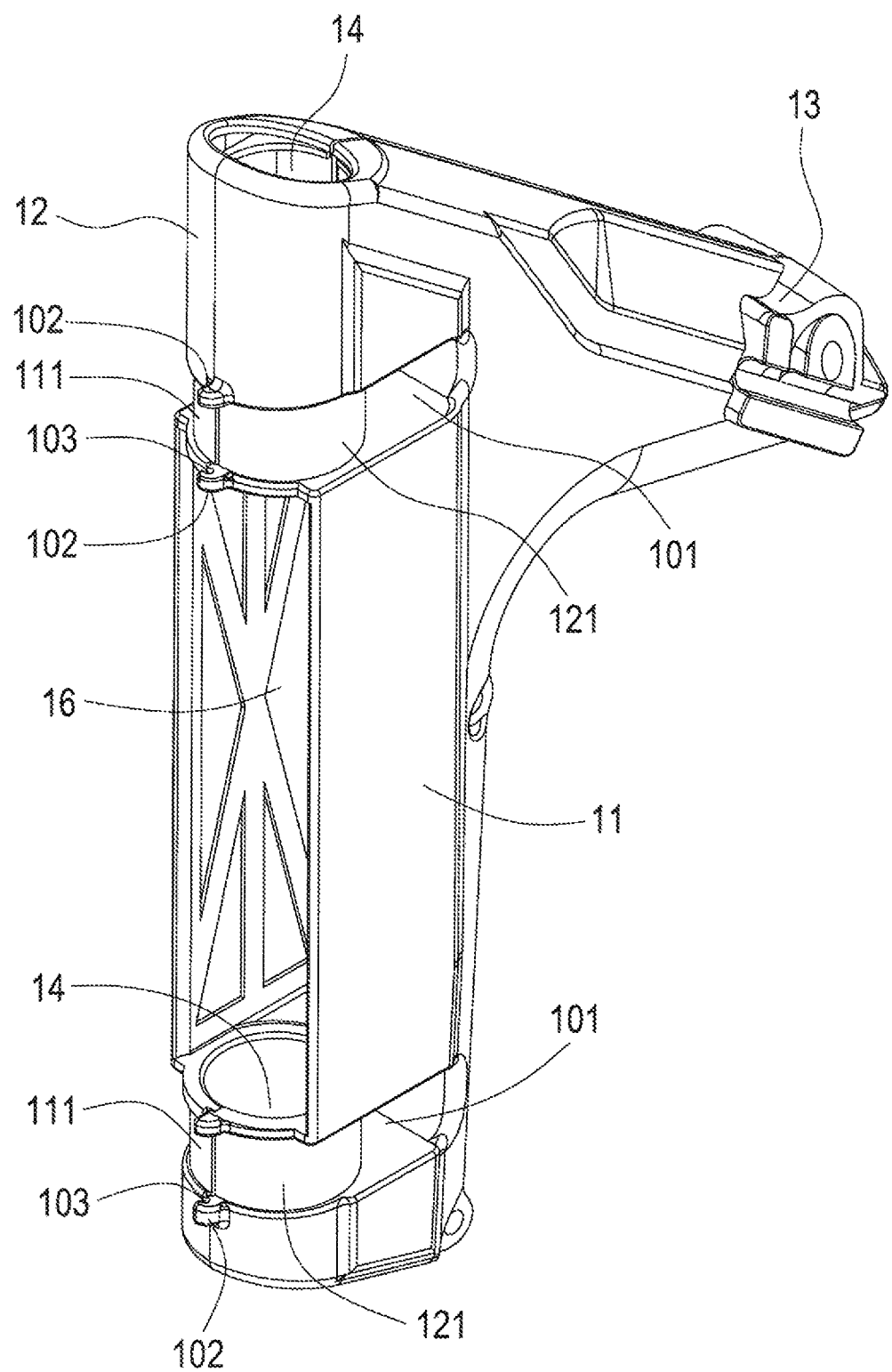
FIG. 3 is a perspective view of a seat body for the saddle adjusting device in accordance with the present invention.
Figure 6:
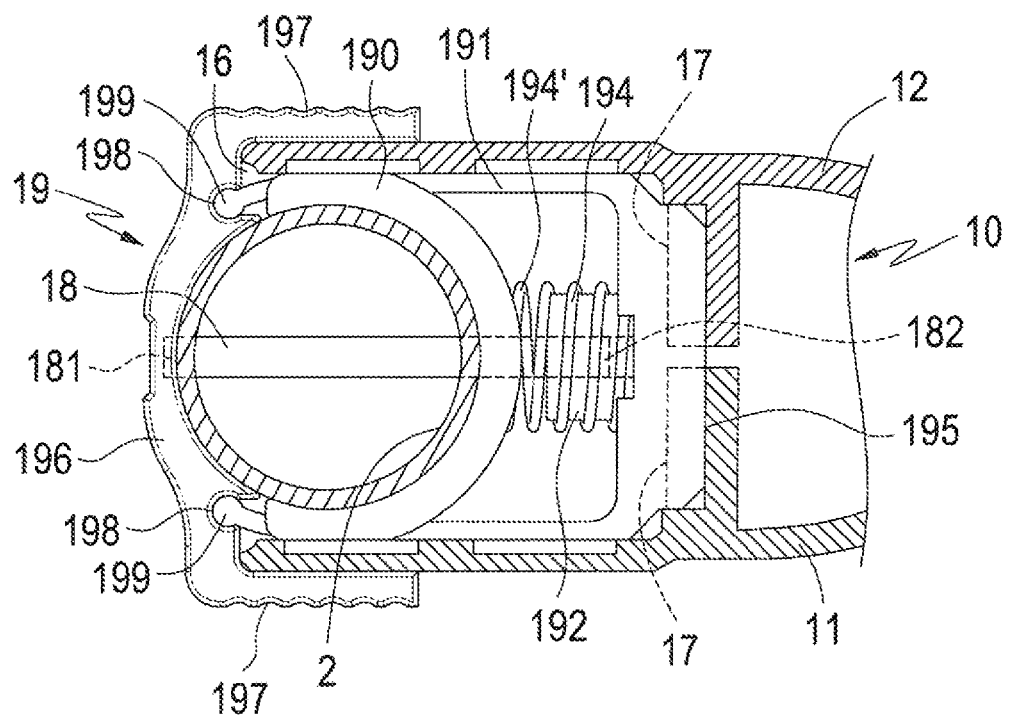
FIG. 6 is a cross-sectional view of the saddle adjusting device in accordance with the present invention along the line 6-6 of FIG. 2.

The seat body 10 is provided in a middle portion of the through portion 14 (namely between the two penetrating portions 101) with a hollow portion 16 which is formed with an opening in a front surface thereof (as shown in FIGS. 3, 6, the left side of the drawings is defined as front, and the right side of the drawings is defined as rear). The hollow portion 16 is also formed between the two shells 11, 12. Further, the hollow portion 16 is formed in a rear surface thereof with plural engaging grooves 17 which are evenly spaced to form a serrated edge, and the serrated edge formed by the spaced engaging grooves 17 is in parallel to the seat tube 2 (as shown in FIG. 2). The respective engaging grooves 17 are open in a direction perpendicular to the axial direction of the seat tube 2.

Figure 5:
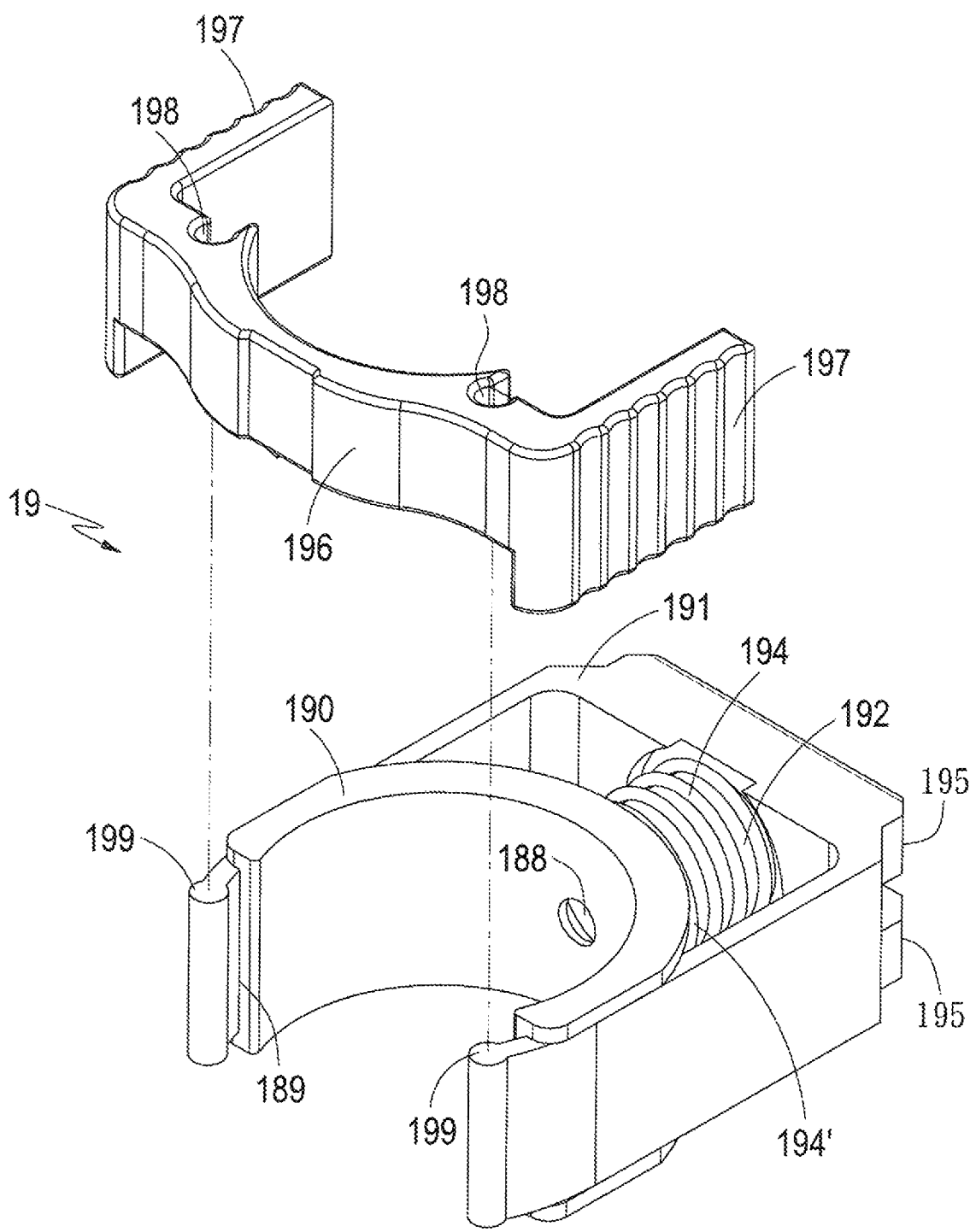
FIG. 5 is an exploded view of an engaging assembly in accordance with the present invention.
Figure 7:
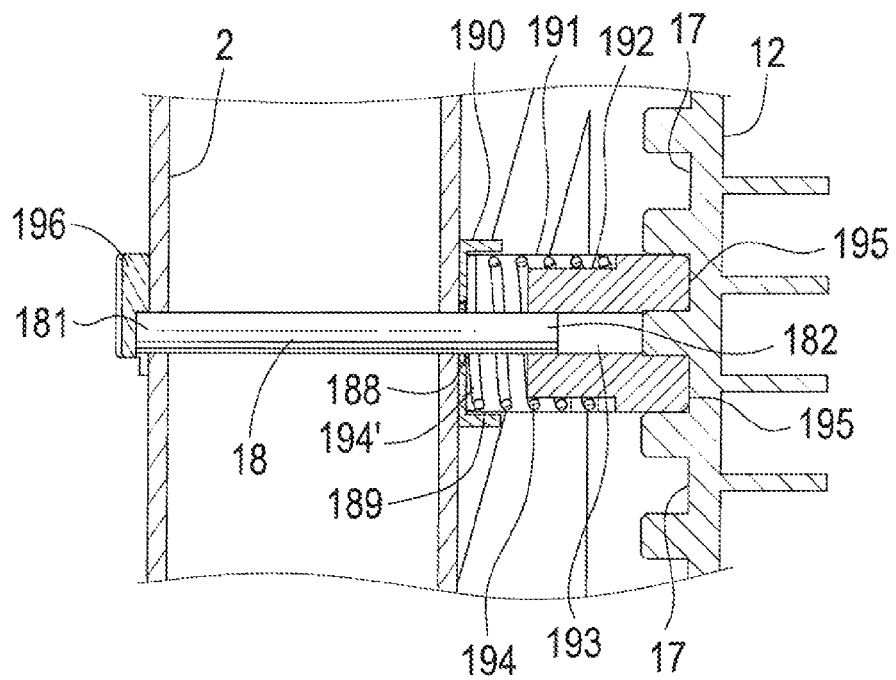
FIG. 7 is a cross-sectional view of an engaging assembly of the saddle adjusting device in accordance with the present invention.
Figure 8:
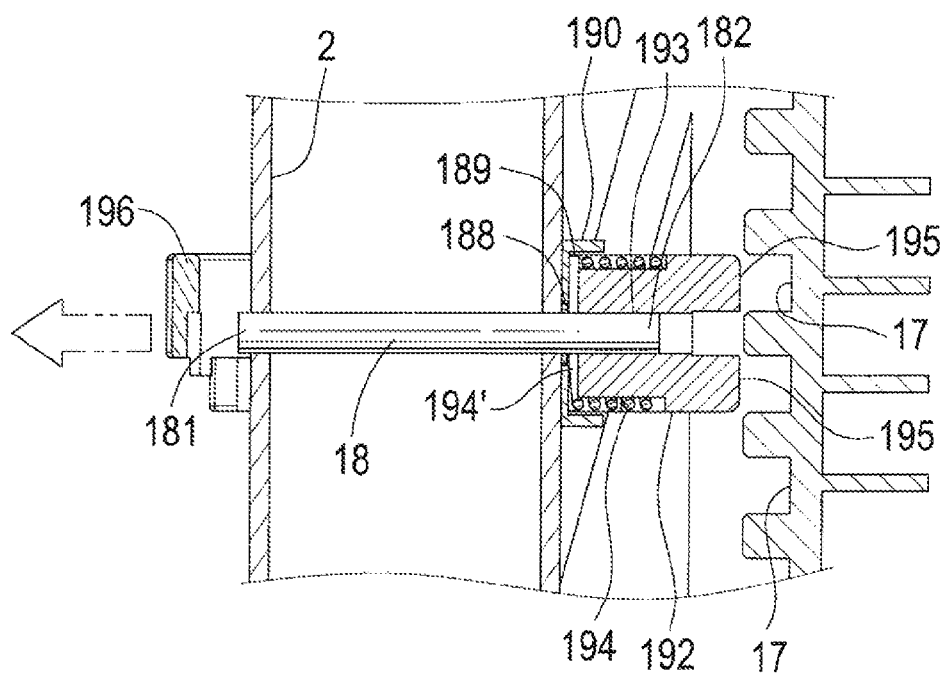
FIG. 8 is an operational view of the engaging assembly of the saddle adjusting device in accordance with the present invention.

A bolt 18 is perpendicular to and inserted in the seat tube 2 in such a manner a first end 181 and a second end 182 of the bolt 18 extend out of the seat tube 2, and the length of the first end 181 that extends out of the seat tube 2 is shorter than that of the second end 182 that extends out of the seat tube 2 (as shown in FIGS. 5-8, the left side of the drawings is defined as front, and the right side of the drawings is defined as rear). It is to be noted that an engaging assembly 19 is slidably inserted on the bolt 18 and comprises a base 191, a sliding seat 192, an arc-shaped member 190, a spring 194 and a connecting seat 196. The base 191 is disposed in the hollow portion 16, both sides of the base 191 are abutted against the oppositely-connected shells 11, 12. The base 191 is provided at its rear side with at least one protruding portion 195 (there are two protruding portions 195 in this embodiment) which can be driven to selectively engage in the engaging grooves 17 of the seat body 10. The sliding seat 192 is a cylindrical structure integrally formed at a center of the inner wall of the base 191 and formed with an inserting hole 193 for insertion of the bolt 18, so that the sliding seat 192 is slidably inserted at the end 182 of the bolt 18 that extends out of the seat tube 2. The spring 194 is inserted on the sliding seat 192 and longer than the sliding seat 192 before being pressed (as shown in FIGS. 6 and 7). The arc-shaped member 190 is U-shaped in cross section to form a U-shaped guiding groove 189 (as shown in FIGS. 5, 7 and 8) so that the arc-shaped member 190 is slidably received in the base 191 in such a manner that both ends of the base 191 are slidably inserted in the U-shaped guiding groove 189 of the arc-shaped member 190. The arc-shaped member 190 is formed with a hole 188 for allowing the arc-shaped member 190 to be inserted on the end 182 of the bolt 18 that extends out of the seat tube 2 before the sliding seat 192 is assembled, so as to bring the surface of the arc-shaped member 190 into contact with the free end 194' of the spring 194, so that the arc-shaped member 190 can be selectively pushed to embrace the seat tube 2. The connecting seat 196 is formed on its inner surface with two engaging portions 198 for engaging with both ends 199 of the base 191, so that the connecting seat 196 can be connected to the base 191 in such a manner that the base 191 can be inserted in the connecting seat 196 via the engagement of the ends 199 with the engaging portions 198. The connecting seat 196 is provided at both sides thereof with two operating portions 197 which are to be located adjacent to the outer periphery of the shells 11, 12 of the seat body 10, and there is a small interval between the two operating portions 197 and the shells 11, 12, so as to facilitate friction free operation, namely, the user can push engaging assembly 19 to move linearly along the bolt 18 easily by grabbing the operating portions 197. When moving linearly along the bolt 18, the base 191 is restricted by the shells 11, 12 of the seat body 10 at both sides of the hollowing portion 16 and the operating portions 197 of the connecting seat 196 from rotating around the bolt 18.

When the height of the saddle 3 needs adjusting, the handles 155 of the two seat tube clamps 15 will be released first to loosen the seat body 10 from the seat tube 2, and then the engaging assembly 19 will be operated in such a manner that the user can grip the operating portion 197 to pull the connecting seat 196 and the base 191 formward, as shown in FIG. 7, at this moment, the protruding portions 195 of the sliding seat 192 will disengage from the engaging grooves 17, so that the user can move the seat body 10 along the seat tube 2 to a desired position, and subsequently, the user will release the operating portion 197, so that the engaging assembly 19 can push the connecting seat 196 and the base 191 backwards by means of the elastic force of the spring 194 to make the two protruding portions 195 engage into the engaging grooves 17 so as to position the seat body 10 assuredly, and finally, the handles 155 of the respective seat tube clamps 15 will be rotated to force the half rings 111, 121 to clamp the seat tube (as shown in FIG. 4) to fix the seat body 10 on the seat tube 2.

The contact area between the respective engaging grooves 17 and the protruding portions 195 are relatively larger, and the engaging assembly 19 is engaged into the engaging grooves 17 by two protruding portions 195, so that the contact area between the engaging assembly 19 and the seat body 10 is enough to position the seat body 10 on the seat tube 2 effectively. Furthermore, the seat body 10 includes the penetrating portions 101 corresponding to the respective seat tube clamps 15, and at each of the penetrating portions 101 are provided two half rings 111, 121 which forms a part of the through portion 14 of the seat body 10, such that the seat tube clamps 15 can be used to force the two half rings 111, 121 to clamp the seat tube assuredly. By such arrangements, the saddle adjusting device in accordance with the present invention can use the two seat tube clamps 15 to cooperate with the engaging assembly 19 to position the seat body 10 on the seat tube 2.

While we have shown and described various embodiments in accordance with the present invention, it is clear to those skilled in the art that further embodiments may be made without departing from the scope of the present invention.

What is claimed is:

1. A saddle adjusting device being slidably disposed on a seat tube and comprising a seat body, the seat body including a support portion on a top end thereof for placement of a saddle, the seat body being provided with a through portion for insertion of the seat tube, and at least one seat tube clamp along the through portion for clamping the seat body on the seat tube, the seat body being provided in a middle portion of the through portion with a hollow portion which is formed with an opening in a front surface thereof, the hollow portion being formed in a rear surface thereof with plural engaging grooves which are evenly spaced to form a serrated edge, and the serrated edge formed by the spaced engaging grooves being in parallel to the seat tube, a bolt being perpendicular to and inserted in the seat tube, an engaging assembly being slidably inserted on the bolt and provided with at least one protruding portion to selectively engage in the engaging grooves of the seat body.

2. The saddle adjusting device as claimed in claim 1, wherein the seat body is made up of two symmetrical oppositely-connected shells.

3. The saddle adjusting device as claimed in claim 1, wherein one end of the bolt, which is located adjacent to the engaging grooves, protrudes out of the seat tube a predetermined length for cooperating with the engaging assembly.

4. The saddle adjusting device as claimed in claim 1, wherein the seat body includes a penetrating portion corresponding to the at least one seat tube clamp.

5. The saddle adjusting device as claimed in claim 1, wherein the engaging assembly is formed with two protruding portions at one side thereof adjacent to the respective engaging grooves.

6. The saddle adjusting device as claimed in claim 1, wherein the respective engaging grooves are open in a direction perpendicular to an axial direction of the seat tube.

7. The saddle adjusting device as claimed in claim 1, wherein the engaging assembly comprises a base, a sliding seat, an arc-shaped member, a spring and a connecting seat, the base is disposed in the hollow portion and provided at its rear side with two protruding portions which are driven to selectively engage in the engaging grooves of the seat body, the sliding seat is a cylindrical structure integrally formed at a center of an inner wall of the base and provided with an inserting hole for insertion of the bolt, so that the sliding seat is slidably inserted on the bolt, the spring is inserted on the sliding seat and longer than the sliding seat before being pressed, the arc-shaped member is U-shaped in cross section to form a U-shaped guiding groove, so that the arc-shaped member is slidably received in the base in such a manner that both ends of the base are slidably inserted in the U-shaped guiding groove of the arc-shaped member, the arc-shaped member is formed with a hole for allowing the arc-shaped member to be inserted on the bolt before the sliding seat is assembled, so as to bring a surface of the arc-shaped member into contact with the free end of the spring, so that the arc-shaped member is allowed to be selectively pushed to embrace the seat tube, the connecting seat is formed on its inner surface with two engaging portions for engaging with both ends of the base, so that the connecting seat is connected to the base in such a manner that the base is inserted in the connecting seat via the engagement of the ends with the engaging portions, the connecting seat is provided at both sides thereof with two operating portions which are capable of making the protruding portions engage in and disengage from the engaging grooves of the seat body by controlling linear movement of the engaging assembly along the bolt.

8. The saddle adjusting device as claimed in claim 1, wherein the seat tube clamp includes two semi-circular pivotally connected fastening members, and one end of one of the two fastening members is pivotally connected to one end of the other of the two fastening members by a pin, and a shaft is inserted through the other ends of both the two fastening members, one end of the shaft is eccentrically pivotally connected with a handle in such a manner that the handle is allowed to be pivoted to loosen or tighten the two fastening members.

9. The saddle adjusting device as claimed in claim 8, wherein the seat body is provided with two ears at both sides of each of the penetrating portions correspondingly to the pin of the seat tube clamp and each of the ears is defined with an engaging hole for engagement with the corresponding pin.

10. The saddle adjusting device as claimed in claim 1, wherein the number of the at least one seat tube clamp is two, and the two spaced seat tube clamps are spaced apart along the through portion.

11. The saddle adjusting device as claimed in claim 10, wherein the seat body includes two penetrating portions corresponding to the respective seat tube clamps.

12. The saddle adjusting device as claimed in claim 10, wherein the seat tube clamp includes two semi-circular pivotally connected fastening members, and one end of one of the two fastening members is pivotally connected to one end of the other of the two fastening members by a pin, and a shaft is inserted through the other ends of both the two fastening members, one end of the shaft is eccentrically pivotally connected with a handle in such a manner that the handle is allowed to be pivoted to loosen or tighten the two fastening members.

13. The saddle adjusting device as claimed in claim 12, wherein the seat body is provided with two ears at both sides of each of the penetrating portions correspondingly to the pin of the seat tube clamp and each of the ears is defined with an engaging hole for engagement with the corresponding pin.

* * * * *